United States Patent [19]

Black

[11] 4,122,033
[45] Oct. 24, 1978

[54] OXIDATION INHIBITOR AND COMPOSITIONS CONTAINING THE SAME

[76] Inventor: James F. Black, 45 Hall Rd., Chatham, N.J. 07928

[21] Appl. No.: 745,388

[22] Filed: Nov. 26, 1976

[51] Int. Cl.$^2$ .................. C09K 15/02; C09K 15/18; C09K 15/18; C08K 3/10

[52] U.S. Cl. ..................... 252/400 A; 252/400 R; 260/45.75 R; 260/45.75 C; 260/45.75 F; 260/45.75 G; 260/45.75 M; 260/45.75 N; 260/45.75 P

[58] Field of Search ............. 252/400 R, 400 A, 49.7; 260/45.75 R, 45.75 C, 45.75 F, 45.75 G, 45.75 M, 45.75 N, 45.75 P

[56] References Cited

U.S. PATENT DOCUMENTS

| 3,320,167 | 5/1967 | Knowles et al. | 252/49.7 |
| 3,412,028 | 11/1968 | Godfrey | 252/49.7 |
| 3,422,014 | 1/1969 | Forbes et al. | 252/400 R |
| 3,459,703 | 8/1969 | Briggs et al. | 260/45.75 G |
| 3,661,843 | 5/1972 | Hechenbleikner | 260/45.75 F |
| 4,008,200 | 2/1977 | Avar et al. | 260/45.75 M |

Primary Examiner—Edward A. Miller
Assistant Examiner—Irwin Gluck
Attorney, Agent, or Firm—Eugene Zagarella, Jr.

[57] ABSTRACT

A method for stabilizing organic materials against autoxidation, a composition useful therefor and organic compositions containing the autoxidation stabilizers. The method comprises the steps of adding a compound capable of reducing the peroxide content and a transition metal containing compound to an organic material and thereafter recovering a stabilized composition. The components of the inhibitor may be added separately or simultaneously and the same may be added directly to the organic material or first combined in a concentrated solution and then added to the organic material. The basic and neutral primary, secondary and tertiary amines have been found particularly effective in reducing the peroxide content. Also, the transition metal salts containing cations which easily change valence by a single electron are the most effective transition metal salts. The inhibitor combination is effective in both liquid and solid compositions. The inhibitor combination is particularly effective in both natural and synthetic lubricating oil compositions, grease compositions, polymers and the like. When used at the most effective relative and actual concentrations, the inhibitor combination will yield stability comparable to that exhibited by conventional oxidation inhibitors even though one component is a known oxidation catalyst.

43 Claims, No Drawings

OXIDATION INHIBITOR AND COMPOSITIONS CONTAINING THE SAME

BACKGROUND OF THE INVENTION

This invention relates to an additive combination and to various compositions comprising the same. More particularly, this invention relates to a combination oxidation inhibitor and to various organic compositions comprising the same.

As is well known, most organic compounds, especially those comprising relatively long hydrocarbon segments, are subject to autoxidation when the same are contacted with oxygen. This oxidation, in turn, results in a deterioration of the base material leading, generally, to increases in acid number and in sludge formation. In this regard, it is generally believed that the autoxidation first results in the formation of hydroperoxides which, in turn, decay, decompose or dissociate to yield corresponding acid, aldehydes, water and other undesirable oxygen-containing products and free radicals, which, in turn, may react to yield more hydroperoxides or higher molecular weight materials, which may or may not contain oxygen in some form. It will, of course, be appreciated that the acids thus formed will increase the total acid number while the higher molecular weight products will lead to increased viscosities and, indeed, if the same are insoluble in the initial media could result in sludge formation.

Heretofore, several materials have been proposed for use designed to prevent autoxidation. Generally, these materials will fall into one of three categories; viz., selective reducing agents, peroxide removers or decomposers and free radical scavengers. The first of these will, of course, be selectively oxidized, when oxygen is present, thereby preventing the formation of the undesirable hydroperoxide in the first place. The second of these, on the other hand, will complex with or decompose the peroxide immediately upon formation, generally, to a product which will not produce additional free radicals. Finally, the latter group simply converts the free radicals to an inert product. Of these, the materials generally classified as peroxide removers or decomposers and those classified as scavengers are most commonly used.

As is also well known, several materials qualify as peroxide removers or decomposers and these materials may be acidic, basic or neutral. Moreover, peroxide removers or decomposers from each of these classes have been used as oxidation inhibitors in various organic compositions such as lubricants, fuels and the like. The basic and neutral materials are, however, most generally used, especially in lubricant type compositions, since increased acid content is generally undesirable. Of the basic and neutral materials, the amines and particularly the naphthenic and aliphatic amines, are commonly used and such use is well known in the prior art. Moreover, amines as well as other possible peroxide complexing agents or decomposers are used for other purposes in organic compositions such as lubricating and specialty oils and fuels.

Similarly, several materials are well-known free radical scavengers and the use of a large number of such scavengers in organic compositions has, heretofore, been proposed. These materials function by interrupting the chain reaction by which oxidation takes place. This chain reaction proceeds by a two-step process. In the first reaction, a peroxy radical or an alkyoxy radical formed from peroxide decomposition attacks the material being oxidized to abstract a hydrogen atom by breaking a carbon hydrogen bond. This results in the formation of a peroxide or an alcohol and an alkyl type radical from the substrate. In the second reaction the alkyl type radical combines with oxygen to form a peroxy radical which can react to start off the chain again. The second reaction is extremely rapid compared to the first. As a result, the concentration of peroxy radicals in normally several magnitudes greater than that of the hydrocarbon radicals. The free radical scavengers normally employed for inhibition are compounds which can react very rapidly with the peroxy radicals to destroy the chain.

Transition metals are well known catalysts for autoxidation. It is well established in the prior art that when organic materials such as lubricating oils, polymers or -plastics must be used in contact with iron, copper or other transition metals it is much more difficult to stabilize them against oxidative degradation. Many laboratory tests for oxidation stability incorporate transition metals, either in their metallic form or as low concentrations of soluble compounds, to accelerate the test and to provide results which are more representative of degradation under conditions of expected use. As the concentration of a transition metal increases, the catalytic activity increases until, at a concentration often referred to as the critical concentration, the catalytic activity drops sharply to zero and at concentrations above this level the transition metal salts function as inhibitors. This phenomenon too is known in the prior art and has been discussed extensively, either directly or indirectly, in a large number of papers published throughout the world but the reasons for this abrupt change have never been completely explained.

Notwithstanding the general knowledge with respect to the ability of the transition metal salts to function as inhibitors, the use of such materials as inhibitors in organic compositions subject to autoxidation has been limited. Reasons for this are that the transition from catalysts to inhibitor has usually been observed to occur at relatively high concentrations; second, that the reasons why an abrupt change from catalyst to inhibitor takes place has not been understood and third, it has been impossible to predict the critical concentration level. Prior attempts to use transition metals as inhibitors have, therefore, produced inconsistent results. This limited use has continued notwithstanding that the cost of the transition metal salts is often less than the cost of the more conventional oxidation inhibitors and notwithstanding evidence that the same will often function as oxidation inhibitors yielding results superior to those often obtained with the more conventional inhibitors.

SUMMARY OF THE INVENTION

It has now surprisingly been discovered that various transition metal containing componds can be effectively used as oxidation inhibitors and that the same may be used with consistent results when used in accordance with the present invention. Accordingly, it is an object of one embodiment of this invention to provide a method whereby certain transition metal containing compounds can be used as oxidation inhibitors in organic compositions subject to autoxidation. It is another object of this embodiment of the invention to provide such a method whereby the transition metal containing compound can be used with good and consistent results. It is an object of another embodiment of this invention to provide an oxidation inhibitor composition which can be added to an organic composition subject to autoxidation in accordance with the method of the first embodiment. It is another object of this second embodiment of the present invention to provide such a composition which can be added to organic compositions subject to autoxidation in such a manner as to yield effective and consistent performance. It is an object of a third embodiment of this invention to provide various organic compositions comprising the inhibitor of the second embodiment and added thereto in accordance with the method of the first embodiment such that the same will exhibit improved oxidation stability.

In accordance with the present invention, the foregoing and other objects and advantages are accomplished by adding one or more transition metal containing compounds in combination with one or more compounds capable of reducing the concentration of hydroperoxide to an organic composition otherwise subject to autoxidation. As indicated more fully hereinafter, it is essential that the concentration of the transition metal containing compound be maintained above a minimum, critical concentration and that the ratio of the transition metal containing compound to the compound capable of complexing with a hydroperoxide be carefully controlled. As also more fully pointed out hereinafter, it is possible through a proper selection of transition metal containing compound combinations to further improve the oxidation stability of the various organic compositions contemplated by the present invention.

DETAILED DESCRIPTION OF THE INVENTION

As previously indicated, the present invention relates to an oxidation inhibitor, a method of using the same and organic compositions comprising the oxidation inhibitor. As also previously indicated, the oxidation inhibitor comprises at least one transition metal containing compound, and a compound capable of reducing the concentration of hydroperoxide in the medium to which the same is ultimately added.

In general, any compound, including the organic and inorganic salts of any transition metal can, under proper circumstances, be effectively used in the oxidation inhibitor of the present invention. As is well known, the transition metals include elements 21 through 29 (scandium through copper), 39 through 47 (yterium through silver), 57 through 79 (lanthanum through gold) and the metals from 89, i.e., the metals of actinide series. A characteristic of these metals is, of course, their ability to exhibit more than one oxidation state and this ability is essential to the performance of the salts used in the oxidation inhibitor of the present invention. In this regard, it should be noted that many of these metals are known to exhibit more than 2 oxidation states and these oxidation states may correspond to a change of from 1 to 5 electrons in the outer orbitals. For purposes of this invention, however, those metals in which the oxidation state differs by only one electron are most preferred, since the transition from one state to the other is most readily achieved.

From the foregoing, it should be clear that salts of scandium, titanium, vanadium, chromium, manganese, iron, cobalt, nickel and copper could be operative in the oxidation inhibitor of the present invention. Similarly, salts of itrium, zirconium, niobium, molybdenum, tellurium, ruthenium, rhodium, palladium and silver could be effective. Also, salts of lanthanum, the rare earth metals, hafnium, tantalum, tungsten, rhenium, osmium, irridium, platinum, gold and the metals of the actenide series could be effectively used. Notwithstanding the general characteristics of these metals, however, some, such as scandium, yttrium, lanthanum and the like exhibit only one known valence state and others, such as nickel, silver, gold and the like do not change valence state easily and as a result, while these metals would, theoretically be useful, they are not, generally, effective in the oxidation inhibitor compositions of the present invention. Also, and as suggested previously, the more stable oxidation states of several of these metals will differ by an even number of electrons and salts of these metals are not, generally, as effective in the inhibitor compositions of the present invention as are the salts of those metals which exhibit stable valence states differing by a single electron. Metals having more stable valence states differing by two or more electrons include titanium, zirconium, vanadium and the like.

With respect to the effectiveness of the various valence states, it should be noted that, while the inventor does not wish to be bound by any particular theory, it is believed that the several metal ions function as inhibitors when they are in a valence state which has an unshared electron in the outer orbital. The same metals, on the other hand, function as catalyst in all other valence states. It is, therefore, believed essential to the present invention that the metal or metals actually employed be capable of an oxidation reduction reaction involving an exchange of electrons which leaves one free electron in the outer shell in one valence state and either no electrons or an even number of electrons in the outer shell in the other state.

Again, and while the inventor does not wish to be bound by any particular theory, it is believed that the following equations are pertinent when the inhibitor compositions of the present invention are used in organic compositions containing one or more materials subject to autoxidation:

$$M^{n+} + ROOH \rightarrow (ROOHM)^{n+} \quad (1)$$

$$(ROOHM)^{n+} \rightarrow M^{n+} + ROOH \quad (2)$$

$$(ROOHM)^{n+} \rightarrow RO\cdot + M^{(n+1)+} + OH^- \quad (3)$$

$$M^{(n+1)+} + ROOH \rightarrow (ROOHM)^{(n+1)+} \quad (4)$$

$$(ROOHM)^{(n+1)+} \rightarrow M^{(n+1)+} + ROOH \quad (5)$$

$$(ROOHM)^{(n+1)+} \rightarrow RO_2\cdot + M^{n+} + H^+ \quad (6)$$

$$RO + RH \rightarrow ROH + R\cdot TM \quad (7)$$

$$R\cdot + O_2 \rightarrow RO_2\cdot \quad (8)$$

$$RO_2\cdot + RH \rightarrow ROOH + R\cdot \quad (9)$$

$$RO_2\cdot + RO_2\cdot \rightarrow Products \quad (10)$$

$$RO_2\cdot + M^{n+} \rightarrow M^{(n+1)+} + Products \quad (11)$$

$$R\cdot + M^{(n+1)+} \rightarrow M^{n+} + Products \quad (12)$$

In these equations, M is the transition metal or metals actually used in the oxidation inhibitor and n is a whole number generally from 1 to 8 reflecting the valence in one of the two oxidation states involved and $n+1$, reflecting another oxidation state (generally, however, the other oxidation state could be represented by $n\pm 1$, 2, 3, 4, 5, 6 or 7). For purposes of the present illustration, R may be any organic radical either substituted or unsubstituted, saturated or unsaturated, straight or branched chain, cyclic or noncyclic, aromatic or naphthenic, etc., and represents that portion of the original organic material remaining after the peroxide has been formed as the result of autoxidation. R, RO and $RO_2$ represent corresponding free radicals. The remaining symbols all have conventional meanings.

As will be apparent from the equations as presented, if the metal ion has an unpaired electron in its lower valence state, it functions as a free radical scavenger in accordance with equation 11, while if the metal has an unpaired electron in its higher state ($n+1$ as illustrated) it will function as a free radical scavenger in accordance with equation 12. Depending, then, as to which of the valence states corresponds to the oxidation state with an unshared electron in the outer shell, termination of the autoxidation reaction will occur in accordance with one of these two equations.

Although the individual equations (1) through (12) have been postulated to be involved in metal catalyzed autoxidation, it has not been recognized that, combined in this manner, they furnish the first satisfactory explanation of why transition metals suddenly change from catalysts to inhibitors as their concentration is increased and what determines the concentration at which this change takes place. This new understanding arises from the recognition that before a transition metal can become a strong inhibitor by terminating autoxidation through either reaction (11) or (12), it is essential that the metal be present in the system at a concentration in excess of the concentration of peroxide present in the system. This requirement arises from the fact that the metal in either the higher or the lower valence state forms a strong complex with peroxide according to equations 1 and 4. Therefore, if the metal is present at a concentration lower than that of the peroxide, almost all of the metal will be converted to the metal peroxide complex which functions as a powerful catalysts for autoxidation through reactions 3 or 6. Inhibition by the free, uncomplexed transition metal ions is unimportant because under existing equilibrium conditions their concentration is restricted to a very low level. As the total concentration of the metal increases, however, to the point at which the total metal concentration exceeds that of the hydroperoxide in the system, the situation suddenly reverses. The transition metal is bound tightly into a complex with the peroxide as before, but there is no longer enough peroxide to sequester all of the transition metal. Therefore, as the total metal concentration approaches and exceeds that of the peroxide in the system, the concentration of free metal ion suddenly changes from a greatly repressed value to a magnitude similar to that of the total metal so that the effect of the transition metal as a powerful inhibitor can suddenly become dominant. This explains why the transition from catalysis to inhibition with transition metals is so sudden and predicts the concentration at which this transition should take place.

In general, the anion portion of the transition metal containing compound may be in essentially any form including both organic and inorganic. It is, however, essential to the present invention that the anion portion be compatible with the remaining portion of the system and particularly the organic composition in which the same will be used. In this regard, it should be noted that the transition metal salts otherwise useful in the present invention would not be useful if either the anion or the cation of the salt reacted with a constituent of the composition in which the same is used so as to prevent the redox reaction leading to the presence of the cation in at least two oxidation states. Moreover, when the inhibitor composition of this invention is used in a liquid composition, it is most desirable that the same be soluble therein and when used in a solid or semi-solid composition that the same be in a form which may be uniformly distributed therethrough.

With the foregoing in mind, then, it should be clear that, depending upon the particular composition in which the inhibitor will be used, the same might be derived from any one or a mixture of the organic and inorganic acids. In this regard, and when an organic acid is used the same may be aromatic, naphthenic, aliphatic, cyclic, branched or a combination of any one or all of these. Moreover, the same may comprise essentially any number of carboxylic acid groups, especially from about 1 to about 6, but acids having only one carboxylic acid group are most preferred. When an inorganic acid, on the other hand, is used, the same may be derived from either a weak or strong acid and, again, compatibility in the system in which the same will be used will be the principal controlling criteria. In this regard, however, it should be noted that the use of weak acids is, generally, preferred since salts derived from strong acids could lead to an increase in total acid number in the organic composition in which the same is used. Also, care should be used in selecting a particular anion moiety so as to ensure that materials which might emit pollutants to the atmosphere are not used.

Notwithstanding that a broad range of anion sources could be used in the salt portion of the inhibitor composition of this invention, the same will, generally, be derived from a carboxylic acid comprising from about 1 to about 50 and preferably from about 8 to about 18 carbon atoms. Moreover, the organic moiety would, generally, be aromatic, naphthenic, aliphatic, cycloaliphatic, or a combination of one or more of these. In a most preferred embodiment, the anion portion of the salt will be derived from a monocarboxylic fatty acid having from about 8 to about 18 carbon atoms.

In general, any compound which will complex with the hydroperoxide more strongly than the cation of the transition metal containing compound could be used in combination with the transition metal containing compound used in the inhibitor composition of this invention. These include both the basic and neutral complexing agents, peroxide decomposers and the like as well as the acidic materials. The use of basic and/or neutral peroxide decomposers does, however, offer the advantage of not increasing the total acid number of the composition in which the same is used and therefore the use of these materials is particularly preferred.

As in the case of the transition metal containing component, essentially any basic or neutral complexing agent, peroxide decomposer or the like could be used in the inhibitor composition of the present invention. It is, however, important that the complexing compound actually used be compatible with the system and that the same not react or in some other way be tied up with another material such that it would not function as a complexing agent, peroxide decomposer or the like, or such that the same would form a noxious material. Moreover, when the inhibitor composition is used in a liquid medium, it is most desirable that the same be soluble therein and when used in a solid or semi-solid material the same must be in a form which can be uniformly distributed throughout the organic composition in which it is used. Operable materials which will complex with the hydroperoxide more strongly than the transition metal ions include the primary, secondary and tertiary amines, the alkyl selenides, particularly the dialkylselenides and the alkyl phosphines and alkyl phosphites, particularly the trialkyl phosphines and trialkyl phosphites wherein the organic portion of the compound may be aliphatic, aromatic, naphthenic or essentially any other structure including mixtures of the type specified. Again, the organic portions may each contain from about 1 to about 50 carbon atoms and preferably from about 8 to 18 carbon atoms. Generally, the length of the organic moiety will be determined on the basis of solubility and in a most preferred embodiment the complexing agent or peroxide decomposer will be a primary amine having from about 8 to about 18 carbon atoms.

Again, and while the inventor still does not wish to be bound by any particular theory, it is believed that the use of a compound which will complex more strongly with hydroperoxides than can the transition metal ion reduces the concentration of uncomplexed peroxide in the organic composition in which the same is used and thereby reduces the amount of transition metal ion in an inhibiting valence state which must be added to produce inhibition, rather than catalysis, of oxidation. Stated somewhat differently, then, it is believed that the presence of a peroxide complexing agent, a peroxide decomposer or the like, changes the critical concentration of the catalyst-inhibitor system, generally, reducing the same in an amount proportionate to the log of the concentration of the complexing agent, the peroxide decomposer or the like. It follows, then, that the use of such a compound will reduce the concentration at which the metal will effect inhibition rather than catalysis and as the amount of such compound is increased the amount of metal required is further decreased. This conclusion is, of course, consistent with experimental observations made in connection with the present invention.

Consistent with these observations, it has been found that effective inhibition can be achieved with total transition metal concentrations as low as about 100 parts per million by weight when the concentration of complexing agent, peroxide decomposer or the like, is sufficient to maintain the peroxide concentration at a substantial minimum. Better, more consistent results are, however, obtained at transition metal concentrations of about 600 parts per million and above and best results are, generally obtained when the transition metal concentration is above about 1000 parts per million. It will, of course, be appreciated that the amount of complexing agent peroxide decomposer or the like required becomes less as the concentration of metal is increased and that minimum concentrations of the complexing compound are required when the metal concentration is above about 1000 parts per million. From an operating standpoint, there does not appear to be an upper limit on the concentration of transition metal or metal ion, as the case may be, in solution or in the composition being inhibited. As a practical matter, however, there is little benefit associated with the use of higher concentrations once a level consistent with best or optimum performance has been achieved. On the other hand, peroxide decomposer, complexing agent or the like concentrations of about 100 parts per million, by weight, and above have been found essential to consistent and optimum results and concentrations of about 20,000 parts per million, by weight, result in maximum reduction in peroxide concentrations. Accordingly, metal or metal ion concentrations within the range from about 100 parts per million, by weight, to about 5000 parts per million, by weight, will be used in the oxidation inhibitor composition of the present invention in combination with peroxide decomposer concentrations within the range from about 20,000 parts per million, by weight, to about 100 parts per million, by weight. It will be understood, however, that peroxide decomposer or complex agent concentrations in the lower portion of this range and particularly within the range from about 1000 parts per million, by weight, to about 10,000 parts per million, by weight, will, generally, ensure maximum consistency at any metal concentration.

At this point, it should be noted that the foregoing ranges of effective concentrations have been found to be applicable to the use of one or more transition metal containing compounds of the same transition metal as well as many combinations which function additively. In another embodiment of the present invention, however, it has been discovered that certain metal combinations function synergistically and when such combinations are used the total metal concentration required for effective as well as consistent oxidation inhibition is reduced as is the amount of peroxide decomposer, complexing agent or the like, required to insure optimum, consistent results. In this regard, it has been found that those metal combinations which will exhibit synergism can be predicted from a consideration of the electromotive force. Particularly, the electromotive force which is important to such prediction is, in effect, the voltage created when the transition metal goes from a catalytic to an inhibitor form. Such voltages can, of course, be either positive or negative. When a combination of metals is used, then, the same will exhibit synergism if the sum of these voltages favors the presence of the stronger inhibitor and/or the weaker catalyst and is, generally, positive.

The electromotive force associated with the conversion of various preferred transition metal ions from a catalytic state to an inhibitor state and useful in the present invention are illustrated in the following table:

| Transition Metal | Catalytic Form | Inhibitor Form | EMS, Volts |
| --- | --- | --- | --- |
| Cr | $Cr^{++}$ | $Cr^{+++}$ | 0.41 |
| Mn | $Mn^{+++}$ | $Mn^{++}$ | 1.51 |
| Fe | $Fe^{++}$ | $Fe^{+++}$ | −0.77 |
| Co | $Co^{+++}$ | $Co^{++}$ | 1.84 |
| Cu | $Cu^{+}$ | $Cu^{++}$ | −0.16 |

From this, it can be predicted that combinations such as chromium and manganese, chromium and cobalt, manganese and iron, manganese and copper, iron and cobalt, and cobalt and copper would exhibit synergism when used in combination as the oxidation inhibitors of the present invention since the electromotive potential would favor reaction between the respective metals in their catalytic form to maintain both of them in the inhibiting form. For this type of synergistic interaction to occur, the transition from catalytic to inhibitor form must represent an oxidation for one metal versus a reduction for the other and the sum of the voltages for these two simultaneous reactions must be positive. Another type of synergistic interaction is possible when the valence change going from the catalytic to the inhibitor form is in the same direction for both metals providing the electromotive force values favor the metal which is the stronger inhibitor when in the inhibiting state. An example of this type of synergism is the mixture of copper, which is a very strong inhibitor as cupric ion, with iron which does not inhibit nearly as strongly. In such a mixture, any cuprous ion present can be oxidized to cupric ion, a strong inhibitor, with the simultaneous reduction of ferric ion which is a weak inhibitor. The copper will therefore be maintained entirely in the inhibiting valence state and will inhibit more effectively than if it were utilized alone.

The electromotive potentials used in making these predictions are measured in aqueous solution and, therefore, must be used cautiously to predict effects in non-polar systems where different solvation characteristics can affect the outcome. However, these predictions have been useful as a guide to discovering synergistic interactions between some metal ions as reported in subsequent examples.

When a synergistic combination of metals is used in the oxidation inhibitors of the present invention, the combinations will, generally, be effective at concentrations of about 100 ppm, by weight, or less, when the amount of peroxide decomposer complexing agents or the like approaches 20,000 ppm, by weight. More consistent and effective results are, however, achieved when the total metal concentration in the composition being treated is at least about 500 ppm, by weight, and when the metal concentration is increased to this amount, the amount of peroxide decomposer, complexing agent or the like can be reduced. Generally, then, the amount of peroxide decomposer complexing agent or the like required at these higher metal concentrations is from about 1000 ppm, to about 10,000 ppm, by weight. Finally, optimum results will, generally, be achieved when the total metal content from a synergistic combination is above about 1000 ppm, by weight and, in this case, peroxide decomposer, complexing agent or the like, concentrations within the range from about 100 ppm, by weight, to about 1000 ppm, by weight, will be effective. Accordingly, when synergistic metal combinations are used the same will be effective at concentrations within the range from about 100 ppm, by weight, to about 5000 ppm, by weight, and the same will be used as peroxide decomposer, complexing agent or the like concentrations within the range from about 20,000 ppm, by weight, to about 100 ppm, by weight. Maximum consistency will, however, be achieved when the synergistic combination is used at a concentration within the range of from about 500 to about 1000 ppm, by weight with corresponding peroxide decomposer, complexing agent or the like concentrations within the range from about 10,000 to 1000 ppm, by weight.

In general, and as suggested previously, the oxidation inhibitors of the present invention may be used to stabilize any organic composition which is subject to autoxidation in the presence of oxygen. In this regard, it should be noted that "compositions", as used herein in connection with an organic composition, is intended to encompass pure compounds as well as naturally occurring and synthetic mixtures.

Broadly, then, the inhibitor compositions of the present invention will be effective as oxidation stabilizers in pure hydrocarbons such as the alkanes, alkenes, alkynes, cyclic hydrocarbons, aromatics, naphthenes and the like. The inhibitors of the present invention are also effective stabilizers for substituted derivatives of the various hydrocarbon compounds and for mixtures of such hydrocarbon compounds, mixtures of the substituted derivatives and mixtures of the hydrocarbon and substituted derivatives. The inhibitors of this invention are also effective in the various oxygen containing hydrocarbon derivatives such as the esters, ethers, alcohols and the like, nitrogen containing derivatives such as the amines, and various sulfur and phosphorous containing derivatives such as sulfides and phosphides. The inhibitors of this invention are also effective as stabilizers for polymers of the various hydrocarbons and substituted hydrocarbons, particularly polyethylene, polypropylene, polyvinylchloride, and the like. The inhibitors of this invention are particularly effective when used as stabilizers for various hydrocarbon distillate fractions such as the various naphthas, kerosene, lubricating and specialty oils, fuel oils, and the like. The inhibitors are also effective as stabilizers for the various synthetic oils such as those derived from polyolefins, esters and the like and the same are particularly effective in modified petroleum products such as greases, waxes and the like.

In general, any suitable method could be used to add the inhibitor compositions of this invention to the organic material which is to be stabilized therewith. Such methods include separate and simultaneous addition of the additive components to the organic material and the components may be added directly or with a carrier material. After addition, it will, of course, be necessary to subject the blend to a mixing action so as to insure uniform distribution of the additive combination throughout the organic material.

Notwithstanding that essentially any method could be used to effect the addition, it has been found most advantageous, from the standpoint of consistency and predictability of performance, to either add the peroxide decomposer, the complexing agent or similar compound to the organic material prior to adding the transition metal containing compound or compounds or to effect the addition simultaneously.

When simultaneous addition is used, this is most effectively accomplished with a concentrated solution of the additive combination which, when prepared in an organic solvent, will, preferably be prepared by first dissolving the peroxide decomposer, the complexing agent or the like in the solvent and thereafter dissolving the transition metal compound or compounds. When a concentrated solution of the additive combination is used, the same will, generally, contain the peroxide decomposer, the complexing agent or the like or a mixture of such compounds at a concentration within the range from about 2 to about 20 wt. % and the transition metal compound or compounds also at a concentration within the range from about 2 to about 20 wt. %. Moreover, when a concentrated solution of the additive combination is used, the same will, generally, be prepared in the same organic material to which it will ultimately be added as an inhibitor or at least in a solvent which is itself soluble therein.

It will, of course, be appreciated that the preparation of a concentrated solution or the addition of an additive combination to an organic medium can, often, be facilitated, particularly where one or more of the additives is a solid, by heating either the solvent or the organic medium into which the same is added and the use of such a technique is contemplated by the present invention. Also, many solid or semi-solid organic materials can be converted to liquid by heating and, where this can be done, it is preferred, in the method of the present invention, to convert such materials to liquids prior to adding the inhibitor combination of this invention. Similarly, and where conversion to a liquid form is not practical, addition of the additive combination to a solution of the solid or semisolid organic media can be used. Where neither liquefaction nor the preparation of a solution is practical, however, addition can be effected by milling or other suitable solid mixing techniques. In this case, though, the selection and use of solid peroxide decomposers complexing agents or the like and solid transition metal compounds is most preferred.

Having thus broadly described the present invention, it is believed that the same will become even more apparent and more readily understood from the description of the preferred embodiment which follows. It should be noted, however, that due to the nature of the present invention the preference actually described is for particularly preferred combinations of transition metal salts and peroxide decomposers and the same could be used in essentially any of the organic compositions heretofore described and, while particularly good results have been achieved with fully formulated lubricating oil and greases, improved stability will be realized when inhibitor compositions of this invention are used in essentially any organic material.

PREFERRED EMBODIMENTS

In a preferred embodiment of the present invention, salts of chromium, cobalt, copper and manganese will be used, either alone or in combination, with an aliphatic amine as a lubricating oil stabilizer. The preferred salts will be those derived or obtained with an organic acid having from about 10 to about 18 carbon atoms and particularly those derived from naphthenic acids and the aliphatic amine will be a primary amine and the same will contain between about 10 and about 18 carbon atoms in the organic moiety thereof. In the preferred embodiment, the preferred salts or mixtures will be present at a concentration of at least 600 parts per million, by weight, in the fully formulated lubricating composition when the same are used individually and when two or more salts are combined the same will be present at a concentration of at least 500 parts per million, by weight. Also, the aliphatic amine peroxide decomposer will be present at a concentration within the range from about 1000 to about 10,000 ppm, by weight. Also, when the salts of two metals are used, the same will be used in relative molar concentrations ranging from about 1:3 to about 3:1.

In the preferred embodiment, the base oil may be any natural or synthetic lubricant base stock. Such oils include naphthenic or paraffinic hydrocarbon base stocks. Such oils also include diester oils such as di(2-ethylhexyl) sebacate; complex oils such as those formed from dicarboxylic acids, glycols and either monobasic acids or monohydric alcohols; silicone oils, sulfide esters; organic carbonates; and other synthetic oils known in the art. In a most preferred embodiment of the present invention, the additive combination of the invention will be used to stabilize the oils against oxidation in the presence of solid transition metal cataysts such as metallic copper or metallic iron.

The invention will be even more readily understood by reference to the following Examples which illustrate the several embodiments thereof.

EXAMPLE 1

In this example, several blends were prepared in a DEWTS solvent 150 neutral base oil. In four of the blends, copper was added as copper naphthenate in concentrations ranging from 0.012% to 0.63%. A fifth blend consisted of the pure base oil alone. All blends were then subjected to oxidation by bubbling air through the blend at a rate of 40 cc/min. for 168 hours while the blend was held at 110° C. The air which had bubbled through the blend was then bubbled through a water trap held at room temperature. The amount of volatile acid formed during the oxidation was determined by titrating the water in the water trap at frequent intervals using a standardized KOH solution with phenolphthalein as the indicator. At the end of the test, the oxidized oil was filtered and the acid number of the filtrate determined by the ASTM D 974 procedure. The acid number of the oxidized oil and the acid number of water accumulated in the water trap during the test were added together to give the total increase in acid number which resulted from oxidation. This is expressed as mg KOH/gm of oil blend. The precipitate filtered from the oxidized oil was washed with normal heptane and its weight recorded as the sludge formed during the test. The composition of each blend and the results observed are summarized in the table below:

EFFECT OF Cu ON THE OXIDATION OF DEWTS SOLVENT 150N BASE STOCK

| % Cu | Δ TAN (mg KOH/gm) | Sludge (mg.) |
| --- | --- | --- |
| 0.0 | 0.2 | 0.3 |
| 0.013 | 9.5 | 195 |
| 0.063 | 14.6 | 221 |
| 0.126 | 18.1 | 335 |
| 0.630 | 1.1 | 0.1 |
| 1.26 | 2.1 | 0.1 |

It can be seen that the amount of oxidation which occurs during the test becomes greater as the copper concentration is increased from 0.012% to 0.126% but that above 0.12% the catalytic effect of the copper disappears and its inhibiting characteristics take over.

EXAMPLE 2

This example presents results obtained with n-trioctylamine, a known hydroperoxide decomposer, in DEWTS solvent 150N base stock. The effect of this additive at two different concentrations is compared to the results obtained with the pure base stock in the same oxidation test described in Example 1. The composition of each blend and the results obtained are summarized in the table below:

| % TOA[1] | Δ TAN (mg KOH/gm) | Sludge (mg.) |
| --- | --- | --- |
| 0.0 | 1.5 | 1.2 |
| 0.8 | 32.3 | 1.3 |
| 1.6 | 51.2 | 1.3 |

[1]n-trioctylamine

These data show that although the n-trioctylamine is a peroxide decomposer the decomposition products apparently can be active in initiating oxidation which produces acids (but not sludge).

EXAMPLE 3

In this example a series of blends were prepared in DEWTS solvent 150N base oil. Several of these samples contained $Cu^{++}$, as copper naphthenate, and 0.8% of the peroxide decomposer, n-trioctylamine. One sample contained the trioctylamine alone and another sample consisted of the pure solvent 150 Neutral base oil. The results obtained when all these samples were oxidized together under the conditions described in Example 1 are presented in the following table:

Cu PLUS A PEROXIDE DECOMPOSER (n-TRIOCTYLAMINE)

| % Cu | % TOA | Δ TAN (mg KOH/mg) | Sludge (mg.) |
|---|---|---|---|
| 0.0 | 0.0 | 1.5 | 1.2 |
| 0.0 | 0.8 | 32.3 | 1.3 |
| 0.06 | 0.8 | 2.0 | 2.2 |
| 0.12 | 0.8 | 2.6 | 1.2 |
| 0.60 | 0.8 | 11.9 | 0.1 |
| 1.20 | 0.8 | 19.1 | 0.5 |

A comparison of these results with those presented in Example 1 shows that the presence of the peroxide decomposer substantially reduces the concentration at which the copper can act as an inhibitor rather than as an oxidation catalyst. Oil blends resistant to oxidation are obtained with either 0.06% or 0.12% copper combined with 0.8% n-trioctylamine, whereas with either of these copper concentrations alone or with the n-trioctylamine alone at 0.8% concentration severe oxidation was encountered.

EXAMPLE 4

In this example a series of blends containing various amounts of $Cu^{++}$, as copper naphthenate, and various concentrations of n-trioctylamine were prepared in the DEWTS solvent 150N base oil and the blends were subjected to oxidation under the conditions described in Example 1. The results are presented in the following table:

Cu PLUS A PEROXIDE DECOMPOSER (n-TRIOCTYLAMINE)

| % Cu | % TOA | Δ TAN (mg KOH/gm.) | Sludge (mg.) |
|---|---|---|---|
| 0.12 | 1.6 | 0.23 | 0.0 |
| 0.12 | 0.8 | 0.35 | 0.0 |
| 0.12 | 0.4 | 0.35 | 3.7 |
| 0.06 | 0.8 | 0.20 | 1.0 |
| 0.06 | 0.6 | 0.21 | 0.6 |
| 0.06 | 0.4 | 0.20 | 1.1 |
| 0.06 | 0.3 | 0.29 | 0.5 |
| 0.06 | 0.2 | 0.24 | 0.5 |
| 0.06 | 0.1 | 0.18 | 0.5 |
| 0.012 | 0.8 | 0.11 | 5.4 |
| 0.012 | 0.1 | 14.48 | 138.8 |

The first three samples show that with the $Cu^{++}$ concentration held at 0.12% while the n-trioctylamine concentration is varied from 0.4 up to 1.6%, substantially equivalent results are obtained. The molecular weight of n-trioctylamine is 5.25 times the atomic weight of copper. A 1:1 complex of the amine with 0.12% copper would require 0.63% of the amine. Similarly, 1.26% of amine would be required to form a 2:1 complex of the amine with copper. The data in the first three lines of this example show that the ability of the amine to reduce the concentration at which copper can act as an inhibitor does not seem to be related to the ability of the amine to form a complex with the copper.

This conclusion is further substantiated by the data on the samples which contained 0.06% $Cu^{++}$ with n-trioctylamine concentrations varying from 0.1% to 0.8%. 0.32% of the amine would be required to form a 1:1 complex with the $Cu^{++}$ at 0.06% concentration. It can be seen here that the effectiveness of the amine is maintained down to a concentration which is about 0.3 that required for 1:1 complex formation and that there is no change in the effect when the concentration of the amine is increased stepwise up to 0.8%, which is 25% greater than that required for the formation of a 2:1 complex of the amine with copper.

The last two lines of this table show that the catalyst to inhibitor transition can be produced with $Cu^{++}$ at concentrations as low as 0.012% using 0.8% peroxide decomposer. But with copper concentrations this low, effective results cannot be achieved when the n-trioctylamine concentration is reduced to 0.1%.

EXAMPLE 5

In this example a series of blends were prepared using $Fe^{+++}$, as iron naphthenate, plus n-trioctylamine in DEWTS solvent 150N base stock. These blends were oxidized according to the procedure described in Example 1 and the results are presented in the following table:

IRON PLUS A PEROXIDE DECOMPOSER (n-TRIOCTYLAMINE)

| % Fe | % TOA | Δ TAN (mg KOH/gm) | Sludge (mg.) |
|---|---|---|---|
| 0.06 | 0.0 | 30.56 | 286.0 |
| 0.06 | 0.1 | 36.60 | (1) |
| 0.06 | 0.4 | 36.15 | 629.0 |
| 0.06 | 2.0 | 22.40 | 28.9 |
| 0.06 | 4.0 | 21.30 | 41.7 |
| 0.12 | 0.0 | 33.77 | (1) |
| 0.12 | 0.1 | 31.04 | 35.3 |
| 0.12 | 0.4 | 27.33 | 24.5 |
| 0.12 | 0.8 | 27.85 | 18.5 |
| 0.12 | 2.0 | 18.31 | 24.1 |
| 0.12 | 4.0 | 15.27 | 26.7 |
| 0.60 | 0.0 | 19.49 | 154.3 |
| 0.60 | 0.1 | 12.63 | 7.0 |
| 0.60 | 0.4 | 9.26 | 8.7 |
| 0.60 | 0.8 | 7.49 | 1.6 |
| 0.60 | 2.0 | 8.37 | 19.1 |
| 0.60 | 4.0 | 0.69 | 140.0 |
| 0.60 | 4.0 | 13.07 | 3.9 |

(1) Too viscous to filter.

These results show that with iron, the peroxide decomposer was not effective when the iron was present at a concentration of 0.60%. Optimum results were obtained with a 0.8% concentration of n-trioctylamine, which is only about 25% of that required to form a 1:1 complex. Additional n-trioctylamine was beneficial with respect to acid number formation but harmful with respect to the formation of sludge. The iron blends oxidized much more rapidly than those containing copper. This could be due to the fact that iron is a less effective inhibitor or to the fact that the iron naphthenate employed contained 50% diluent oil of unknown oxidation stability.

EXAMPLE 6

Due to the rapid oxidation experience in blends containing iron naphthenate, a series of blends similar to those discussed in Example 5 were oxidized for 120 hours under conditions otherwise the same as those used in Example 1. The results are presented in the following table:

120 Hr. TEST ON IRON PLUS n-TRIOCTYLAMINE

| % Fe | % TOA | Δ TAN (mg KOH/gm.) | Sludge (mg.) |
|---|---|---|---|
| 0.06 | 0.0 | 24.2 | 4.9 |
| 0.12 | 0.0 | 24.0 | 6.7 |
| 0.60 | 0.0 | 8.0 | 7.1 |
| 1.20 | 0.0 | 2.5 | 1.8 |
| 0.06 | 0.1 | 26.1 | 21.9 |
| 0.06 | 0.4 | 27.1 | 20.3 |
| 0.06 | 0.8 | 25.6 | 18.5 |
| 0.12 | 0.1 | 19.7 | 9.6 |
| 0.12 | 0.4 | 20.2 | 8.3 |
| 0.12 | 0.8 | 18.0 | 8.7 |
| 0.60 | 0.1 | 8.0 | 3.1 |
| 0.60 | 0.4 | 3.6 | 4.0 |
| 0.60 | 0.8 | 1.1 | 0.3 |

These results are similar to those presented in Example 5 in that little benefit was produced from the use of n-trioctylamine at $Fe^{+++}$ concentrations of 0.12% or less. Again, however, a synergistic interaction is observed to occur with blends containing 0.60% $Fe^{+++}$.

EXAMPLE 7

In this Example, a series of blends containing $Co^{++}$, as the naphthenate, with the peroxide decomposer n-trioctylamine were prepared in DEWTS solvent 150N base stock. These blends were all oxidized under the conditions described in Example 1. The results, presented in the following Table, show that concentrations of the amine of at least 0.8% are needed to produce synergism.

COBALT PLUS A PEROXIDE DECOMPOSER

| % Co | % TOA | Δ TAN (mg KOH/gm.) | Sludge (mg.) |
|---|---|---|---|
| 0.06 | 0.0 | 39.0 | 40.8 |
| 0.12 | 0.0 | 32.0 | 14.2 |
| 0.60 | 0.0 | 17.1 | 8.7 |
| 0.06 | 0.4 | 33.7 | 17.1 |
| 0.12 | 0.4 | 34.1 | 14.2 |
| 0.60 | 0.4 | 26.4 | 26.9 |
| 0.06 | 0.8 | 37.9 | 26.4 |
| 0.12 | 0.8 | 32.5 | 5.1 |
| 0.60 | 0.8 | 9.0 | 2.3 |

EXAMPLE 8

In this Example, a series of blends containing $Cu^{++}$, as the naphthenate, were prepared in the DEWTS solvent 150N base oil. These were tested under the oxidation conditions described in Example 1 except that 6 cm. of No. 14 electrolytic copper wire, cut into 1 cm. lengths, were introduced into the oil and were present during the oxidation. The results are presented in the following table.

Cu PLUS Cu WIRES IN DEWTS-SOLVENT 150N

| % Cu | Δ TAN (mg KOH/gm) | Sludge (mg.) |
|---|---|---|
| 0.0 | 2.30 | 13.0 |
| 0.012 | 13.10 | 155.0 |
| 0.06 | 15.80 | 117.8 |
| 0.12 | 0.26 | 0.9 |
| 0.60 | 0.82 | 1.4 |
| 1.20 | 0.89 | 1.7 |

These data show that the presence of the copper wire resulted in an increase in the oxidation of the pure base stock as can be seen by comparing the first line of this table with the results presented in previous examples. In the presence of the copper wire, the transition from catalysis to inhibition occurred at a copper concentration of 0.12%.

EXAMPLE 9

In this Example, a series of blends were prepared using $Cu^{++}$, as the naphthenate, and the peroxide decomposer n-trioctylamine in DEWTS solvent 150N base stock and these samples were oxidized in the presence of copper wire as described in Example 8. The results are presented in the following table:

Cu PLUS A PEROXIDE DECOMPOSER (TOA) WITH Cu WIRES

| % Cu | % TOA | Δ TAN (mg KOH/gm.) | Sludge (mg.) |
|---|---|---|---|
| 0.0 | 0.0 | 2.25 | 9.3 |
| 0.0 | 0.4 | 7.88 | 25.5 |
| 0.012 | 0.4 | 0.07 | 1.4 |
| 0.06 | 0.4 | 0.41 | 1.5 |
| 0.12 | 0.4 | 0.28 | 1.5 |
| 0.60 | 0.4 | 1.41 | 1.2 |
| 0.0 | 0.8 | 17.14 | 41.1 |
| 0.012 | 0.8 | 0.39 | 3.7 |
| 0.06 | 0.8 | 0.65 | 5.7 |
| 0.12 | 0.8 | 0.50 | 1.9 |
| 0.60 | 0.8 | 1.64 | 1.5 |

These data show that in the presence of copper wire, the decomposition products resulting from the presence of the peroxide decomposer n-trioctylamine are capable of initiating both acid and sludge formation. The presence of either 0.4% or 0.8% of the peroxide decomposer, however, will permit the inhibition rather than the catalytic properties of $Cu^{++}$ to be exhibited at concentrations as low as 0.012%. In other words, the catalytic effect of the copper wire in accelerating the oxidative degradation of the base oil can be overcome by adding a small concentration of soluble copper to the base oil as long as a peroxide decomposer is incorporated in the formulation.

EXAMPLE 10

In this Example, a series of blends containing $Fe^{+++}$, as the naphthenate, and some also containing the peroxide decomposer n-trioctylamine were prepared in DEWTS solvent 150N base oil and oxidized in the presence of copper wires according to the procedure described in Example 8. The results are presented in the following table:

Fe PLUS A PEROXIDE DECOMPOSER (TOA) PLUS Cu WIRES

| % Fe | % TOA | Δ TAN (mg KOH/gm.) | Sludge (mg.) |
|---|---|---|---|
| 0.0 | 0.0 | 2.54 | 13.0 |
| 0.012 | 0.0 | 30.20 | 686.0 |
| 0.06 | 0.0 | 32.45 | 1006.7 |
| 0.12 | 0.0 | 36.73 | 72.6 |
| 0.60 | 0.0 | 18.86 | 52.6 |
| 1.20 | 0.0 | 1.64 | 1.0 |
| 0.0 | 1.0 | 0.66 | 13.0 |
| 0.012 | 1.0 | 0.34 | 17.6 |
| 0.06 | 1.0 | 0.26 | 1.1 |
| 0.12 | 1.0 | 0.31 | 2.6 |
| 0.60 | 1.0 | 1.83 | 3.2 |
| 1.20 | 1.0 | 2.85 | 5.0 |

In the upper half of this table it can be seen that in the presence of copper wires, the transition from catalysis to inhibition occurs with $Fe^{+++}$ solution at an iron concentration between 0.6% and 1.20% if no peroxide decomposer is present. In the presence of 1% n-trioctylamine, however, the transition from catalyst to inhibitor occurs at a concentration in the neighborhood of 0.012% $Fe^{+++}$.

EXAMPLE 11

In this Example, a series of blends were prepared using varying concentrations of $Cu^{++}$, as the naphthenate, in DEWTS solvent 150N base oil and some of the samples containing 0.012% $Cu^{++}$ were blended with varying amounts of the peroxide decomposer n-trioctylamine. These samples were tested under the conditions described for Example 1 except that a coil of interwined copper and iron wire, of the type used in the ASTM D 943 test and of a length to give the same ratio of wire to oil as employed in that test, was inserted in the oil prior to the test and remained there as the test was conducted. The results are presented in the following table:

Cu PLUS A PEROXIDE DECOMPOSER WITH Cu AND Fe WIRES

| % Cu | % TOA | Δ TAN (mg.KOH/gm.) | Sludge (mg.) |
|---|---|---|---|
| 0.0 | 0.0 | 2.72 | 10.3 |
| 0.012 | 0.0 | 13.96 | 179+ |
| 0.060 | 0.0 | 3.47 | 4.8 |
| 0.12 | 0.0 | 2.08 | 3.3 |
| 0.60 | 0.0 | 1.19 | 1.5 |
| 1.20 | 0.0 | 1.74 | 1.4 |
| 0.012 | 0.80 | 0.03 | 17.9 |
| 0.012 | 0.10 | 0.11 | 1.9 |
| 0.012 | 0.05 | 0.35 | 1.2 |
| 0.012 | 0.02 | 0.46 | 3.3 |
| 0.0 | 0.80 | 0.10 | 9.7 |

This table shows that in the presence of both copper and iron wire, the transistion from a catalyst to an inhibitor in the absence of a peroxide decomposer takes place at a soluble copper concentration between 0.012% and 0.060%. The sludge formation for the 0.012% copper sample in line 2 of this table represents a minimum value since some of the sludge was lost during the workup. The data in the last five lines of this table, however, show that the catalyst to inhibitor transition can be produced at 0.012% $Cu^{++}$ if the n-trioctylamine is incorporated in the formulation.

EXAMPLE 12

In this Example, a series of blends of $Fe^{+++}$, as the naphthenate, some of which contained the peroxide decomposer n-trioctylamine, were prepared in DEWTS solvent 150N base oil were oxidized under the conditions described in Example 11. The results are presented in the following table;

Fe PLUS A PEROXIDE DECOMPOSER WITH Cu AND Fe WIRES

| % Fe | % TOA | Δ TAN (mg KOH/gm.) | Sludge (mg.) |
|---|---|---|---|
| 0.0 | 0.0 | 2.72 | 10.3 |
| 0.012 | 0.0 | 26.29 | 513+ |
| 0.060 | 0.0 | (1) | (1) |
| 0.12 | 0.0 | (1) | (1) |
| 0.60 | 0.0 | 8.86 | 11.0 |
| 1.20 | 0.0 | 1.84 | 1.2 |
| 0.060 | 0.10 | 32.98 | 416.7 |
| 0.12 | 0.10 | 24.30 | 36.9 |
| 0.60 | 0.10 | 1.07 | 1.2 |
| 0.060 | 0.40 | 0.03 | 1.2 |
| 0.12 | 0.40 | 9.45 | 1.8 |
| 0.60 | 0.40 | 1.05 | 2.4 |
| 0.12 | 0.80 | 0.14 | 1.1 |
| 0.60 | 0.80 | 0.69 | 2.4 |
| 0.0 | 0.80 | 0.10 | 9.7 |

(1) too viscous to filter.

The data in the upper part of this table show that in the presence of copper and iron wires and in the absence of a peroxide decomposer, the transition from catalyst to inhibitor for $Fe^{+++}$ occurs at a concentration greater than 0.60% iron and that massive oxidation occurs at $Fe^{+++}$ concentrations below this value. In the presence of 0.10% n-trioctylamine, however, the transition to inhibitor occurs at an iron concentration below 0.60%. With an n-trioctylamine concentration of 0.40% or greater, however, inhibition is observed at all the $Fe^{+++}$ concentrations which were measured.

EXAMPLE 13

In this Example, several blends containing differing concentrations of both $Cu^{++}$ and $Fe^{+++}$, as the naphthenate, were prepared in DEWTS solvent 150N base stock. Three of these blends also contained 1% of n-trioctylamine. They were oxidized under the conditions described in Example 1. The results are presented below:

Cu + Fe IN DEWTS WITH TOA at 110° C. FOR 7 DAYS WITH 40 cc AIR/MIN.

| % Cu | % Fe | % TOA | Δ TAN (Mg KOH/gm.) | Sludge (mg.) |
|---|---|---|---|---|
| 0.6 | 0.6 | — | 0.17 | 1.0 |
| 0.6 | 0.12 | — | 4.20 | 1.1 |
| 0.6 | 0.06 | — | 0.23 | 0.8 |
| 0.12 | 0.6 | — | 0.40 | 0.9 |
| 0.12 | 0.12 | — | 0.21 | 0.9 |
| 0.12 | 0.06 | — | 1.72 | 0.5 |
| 0.06 | 0.6 | — | 0.59 | 1.0 |
| 0.06 | 0.12 | — | 0.36 | 0.2 |
| 0.06 | 0.06 | — | 0.70 | 0.2 |
| 0.6 | 0.6 | 1.0 | 5.37 | 4.5 |
| 0.12 | 0.12 | 1.0 | 0.20 | 3.5 |
| 0.06 | 0.06 | 1.0 | 0.55 | 23.5 |

A comparison of these data with those presented in Example 1 and in Example 5 shows the synergistic effect produced by having both $Cu^{++}$ and $Fe^{+++}$ present in the oil. Very satisfactory inhibition was produced by all combinations studied. In these circumstances addition of the TOA did not produce any additional benefit and in fact seemed detrimental to some extent.

EXAMPLE 14

In this Example, several blends were prepared by dissolving $Cu^{++}$, as the naphthenate, and n-dodecylamine in a DEWTS solvent 150N base stock. These blends were oxidized under the conditions described in Example 1. The results are presented along with comparative data from Example 1 in the following table:

SYNERGISM BETWEEN Cu AND DODECYLAMINE

| $Cu^{(1)}$ % | Dodecylamine % | Δ TAN (mg KOH/gm) | Sludge (mg.) |
|---|---|---|---|
| — | — | 1.5 | 1.3 |
| 0.06 | — | 14.6 | 220.8 |
| 0.12 | — | 18.1 | 334.7 |
| — | 0.1 | 0.98 | 1.1 |
| 0.06 | 0.1 | 0.23 | 0.0 |
| 0.12 | 0.1 | 0.67 | 2.5 |
| — | 0.8 | 34.3 | 0.3 |

-continued

| $Cu^{(1)}$ % | Dodecylamine % | Δ TAN (mg KOH/gm) | Sludge (mg.) |
|---|---|---|---|
| 0.06 | 0.8 | 0.50 | 0.2 |
| 0.12 | 0.8 | 0.23 | 1.6 |

(1) As copper naphthenate

These data show that the concentration at which copper which act as an inhibitor rather than a catalyst was reduced from the level of 0.6% as shown in Example 1 down to a concentration of 0.06% or less by the presence of the peroxide decomposer, n-dodecylamine.

EXAMPLE 15

In this Example several blends were prepared using $Cu^{++}$, as copper naphthenate, and diabietylthiodipropionate in a DEWTS solvent 150N base oil. These oils were oxidized under the conditions described in Example 1. The results are presented in the following table:

DIABIETYLTHIODIPROPIONATE (DATDP) AS A PEROXIDE DECOMPOSER

| Cu% | DATDP % | Δ TAN (mg KOH/gm.) | Sludge (mg.) |
|---|---|---|---|
| 0.0 | 0.1 | 0.9 | 0.3 |
| 0.06 | 0.1 | 10.4 | 191 |
| 0.12 | 0.1 | 1.1 | 0.7 |
| 0.0 | 0.8 | 0.04 | 0.4 |
| 0.06 | 0.8 | 8.1 | 90 |
| 0.12 | 0.8 | 0.4 | 1.5 |

These results show that DATDP is quite effective even when used alone. But it is not acting simply as a conventional free radical inhibitor. If that were the case, it should be more effective in inhibiting oxidation in the presence of the lower copper concentration where the copper catalyzed oxidation is proceeding with less velocity. Instead, it is more effective at the higher copper concentration, showing that it lowers the concentration at which copper can be converted from a catalyst to an inhibitor and therefore is acting as a peroxide decomposer.

EXAMPLE 16

In this Example, copper, cobalt, iron, copper and cobalt and copper and iron were added to a DEWTS Solvent 150N base oil and the blend then thickened with 12-hydroxy substituted lithium stearate to form a grease. The "spindle life" of the resulting grease at 250° F. was then determined by conventional methods. The results obtained are summarized and compared with a grease containing no additives in the following table:

| Cu, Wt. % | Co, Wt. % | Fe, Wt. % | Spindle Life, Hrs. |
|---|---|---|---|
| 0 | 0 | 0 | 386,550 |
| 0.1 | 0 | 0 | 770,900 |
| 0 | 0.1 | 0 | 220,400 |
| 0 | 0 | 0.1 | 260,660 |
| 0.1 | 0.1 | 0 | 1350,1540 |
| 0.1 | 0 | 0.1 | 1920,980 |
| Commercial Grease good at 250° F. | | | 750 |

These data show that greases of excellent stability at 250° F. are produced by using combinations of either Cu + Co or Cu + Fe as the inhibitors.

EXAMPLE 17

In this Example, several blends were prepared in an ester oil base stock containing 66 mol % of ester obtained by esterifying trimethylol propane with a mixture of aliphatic monocarboxylic acids having from 7 to 10 carbon atoms therein and 34 mol % of esters obtained by esterifying a technical grade pentaerythritol with a mixture of aliphatic monocarboxylic acids having from 5 to 10 carbon atoms. The acids used to esterify the trimethylolpropane contained 7.9 carbon atoms, on average, while those used to esterify the pentaerythritol contained 6.0 carbon atoms, on average. The sulfur content of this synthetic ester is less than 2 ppm. In two blends, only copper, as copper naphthenate, was added. In two other blends, only trioctylamine (TOA) was added. In the remaining two blends, copper as copper naphthenate, and trioctylamine were added. All blends were then subjected to oxidation in the FTMS (Federal Test Method Standard) 791-5308-6 test for synthetic aviation oil stability. The composition of each blend and the results are summarized in the table following:

| $Cu^{++}$, Wt.% | TOA Wt.% | Δ TAN mg.KOH/mg | ΔKV at 100° F. |
|---|---|---|---|
| 0.012 | 0 | 49.6 | 67.9 |
| 0.12 | 0 | 17.0 | 32.8 |
| 0 | 0.2 | 47.3 | 85.5 |
| 0 | 1.0 | 44.5 | 69.0 |
| 0.12 | 0.2 | 15.2 | 18.3 |
| 0.12 | 1.0 | 8.7 | 16.6 |

From the foregoing examples, it is clear that transition metal salts which are useful in the present invention are effective oxidation inhibitors for a broad range of organic materials when the same are used, either alone or in combination, with a peroxide decomposer. These Examples, are, however, included solely for the purpose of illustration and are in no way intended to be limiting. The scope of the invention should, therefore, be determined solely from the appended claims.

Having thus described and illustrated the invention, what is claimed is:

1. A method for stabilizing an organic material against autoxidation comprising the steps of:
   (a) adding about 100 to about 20,000 ppm by weight of a compound capable of reducing the peroxide content and compatible with the other components of the system, said compound selected from the group consisting of:
      (i) aliphatic amines,
      (ii) alkyl selenides, and
      (iii) alkyl phosphines and phosphites; wherein the aliphatic and alkyl portions of said compound each contain from about 1 to about 50 carbon atoms;
   (b) adding at least about 100 ppm by weight of a transition metal containing compound which is compatible with the other components of the system; and
   (c) recovering a stabilized organic material.

2. The method of claim 1 wherein the cation portion of the transition metal compound is derived from a transition metal which changes valence easily by one electron.

3. The method of claim 2 wherein said compound capable of reducing the peroxide content is an aliphatic amine.

4. The method of claim 3 wherein the transition metal containing compound is a salt of an organic acid having from about 1 to about 50 carbon atoms.

5. The method of claim 4 wherein said transition metal is selected from the group consisting of copper, manganese, chromium, iron and cobalt.

6. The method of claim 5 wherein said aliphatic amine is a primary, secondary or tertiary aliphatic amine wherein each aliphatic group contains from about 8 to about 18 carbon atoms.

7. The method of claim 6 wherein the hydrocarbon portion of said transition metal salt contains from about 8 to about 18 carbon atoms.

8. The method of claim 7 wherein the transition metal salt is copper naphthenate.

9. The method of claim 7 wherein a mixture of transition metal salts is used.

10. The method of claim 9 wherein the transition metal salt mixture comprises a salt of chromium and a salt of manganese.

11. The method of claim 9 wherein the transition metal mixture comprises a salt of chromium and a salt of cobalt.

12. The method of claim 9 wherein the transition metal salt mixture comprises a salt of manganese and a salt of iron.

13. The method of claim 9 wherein the transition metal salt mixture comprises a salt of manganese and a salt of copper.

14. The method of claim 9 wherein the transition metal salt mixture comprises a salt of iron and a salt of cobalt.

15. The method of claim 9 wherein the transition metal salt mixture comprises a salt of cobalt and a salt of copper.

16. The method of claim 7 wherein the amine is trioctylamine.

17. The method of claim 7 wherein the amine is dodecylamine.

18. The method of claim 7 wherein from about 1000 to about 10,000 ppm by weight of said aliphatic amine is used.

19. The method of claim 18 wherein from about 100 to about 5000 ppm by weight of said transition metal salt is used.

20. The method of claim 4 wherein the compound capable of reducing the peroxide content and the transition metal salt are added simultaneously.

21. The method of claim 20 wherein the compound capable of reducing the peroxide content and the transition metal salt are added to the organic material as a concentrated solution of said components dissolved in an organic solvent.

22. An organic composition stabilized against autoxidation comprising an organic material and
(a) from about 100 to about 20,000 ppm by weight of a compound capable of reducing the peroxide content and compatible with the other components of the composition, said compound selected from the group consisting of:
(i) aliphatic amines,
(ii) alkyl selenides, and
(iii) alkyl phosphines and phosphites; wherein the aliphatic and alkyl portions of said compound each contain from about 1 to about 50 carbon atoms; and
(b) at least about 100 ppm by weight of a transition metal compound which is compatible with the other components of the composition.

23. The composition of claim 22 wherein the cation of said transition metal containing compound is derived from a transition metal which changes valence easily by one electron.

24. The composition of claim 23 wherein said compound capable of reducing peroxide is an aliphatic amine.

25. The composition of claim 24 wherein the transition metal containing compound is a salt of an organic acid having from about 1 to about 50 carbon atoms.

26. The composition of claim 25 wherein said transition metal is selected from the group consisting of copper, manganese, chromium, iron and cobalt.

27. The composition of claim 26 wherein said aliphatic amine is a primary, secondary or tertiary aliphatic amine wherein each aliphatic group contains from about 8 to about 18 carbon atoms.

28. The composition of claim 27 wherein the hydrocarbon portion of said transition metal salt contains from about 8 to about 18 carbon atoms.

29. The composition of claim 28 wherein from about 1000 to about 10,000 ppm by weight of said aliphatic amine is used.

30. The composition of claim 29 wherein from about 100 to about 5000 ppm by weight of said transition metal salt is used.

31. The composition of claim 29 wherein said amine is trioctylamine or dodecylamine.

32. The composition of claim 31 wherein the transition metal salt is copper naphthenate.

33. The composition of claim 32 wherein said organic material is selected from the group consisting of hydrocarbons, hydrocarbon polymers and natural or synthetic lubricating base oils.

34. The composition of claim 24 wherein said organic material is a polymer.

35. The composition of claim 34 wherein said polymer is a polyolefin.

36. The composition of claim 34 wherein said polymer is a polymer of a substituted olefin.

37. The composition of claim 34 wherein said polymer is polypropylene.

38. The composition of claim 24 wherein said organic material is a lubricating base oil stock.

39. The composition of claim 38 wherein said lubricating base oil stock is a solvent neutral base oil.

40. The composition of claim 38 wherein said lubricating base oil stock is an ester base oil.

41. The composition of claim 24 wherein said organic material is a solid lubricant.

42. The composition of claim 41 wherein said solid lubricant is a lithium hydroxy substituted stearate thickened grease.

43. The composition of claim 41 wherein said solid lubricant is a lithium epoxy substituted stearate thickened grease.

* * * * *